(12) United States Patent
Murata et al.

(10) Patent No.: US 11,712,829 B2
(45) Date of Patent: Aug. 1, 2023

(54) MOLD CLAMPING DEVICE HAVING A HALF NUT AND INJECTION MOLDING APPARATUS

(71) Applicant: NISSEI PLASTIC INDUSTRIAL CO., LTD., Nagano-ken (JP)

(72) Inventors: Atsushi Murata, Nagano-ken (JP); Tomonori Karasawa, Nagano-ken (JP); Hirofumi Murata, Nagano-ken (JP); Hozumi Yoda, Nagano-ken (JP)

(73) Assignee: NISSEI PLASTIC INDUSTRIAL CO., LTD.

( * ) Notice: Subject to any disclaimer, the term of this patent is extended or adjusted under 35 U.S.C. 154(b) by 344 days.

(21) Appl. No.: 16/924,120

(22) Filed: Jul. 8, 2020

(65) Prior Publication Data

US 2021/0078229 A1    Mar. 18, 2021

(30) Foreign Application Priority Data

Sep. 12, 2019 (JP) ................................ 2019-165834

(51) Int. Cl.
*B29C 45/17* (2006.01)
*B29C 45/68* (2006.01)

(52) U.S. Cl.
CPC ........ *B29C 45/68* (2013.01); *B29C 2045/686* (2013.01)

(58) Field of Classification Search
None
See application file for complete search history.

(56) References Cited

U.S. PATENT DOCUMENTS

| 5,863,474 A | * | 1/1999 | Ito | ........................ | B29C 45/1751 |
| | | | | | 264/40.5 |
| 6,613,262 B1 | * | 9/2003 | Arend | .................. | B29C 45/6728 |
| | | | | | 264/328.8 |

(Continued)

FOREIGN PATENT DOCUMENTS

| DE | 2014000837 | 7/2014 | | |
| DE | 102015101852 B3 | * | 3/2016 | ............. B29C 45/84 |

(Continued)

OTHER PUBLICATIONS

English-language machine translation of Japanese Publication No. 60-224517, Puchlication Date Nov. 8, 1985.

(Continued)

*Primary Examiner* — Armand Melendez
(74) *Attorney, Agent, or Firm* — Adams & Wilks

(57) ABSTRACT

An injection molding apparatus has a mold clamping device that includes a traction platen disposed below a pressure-receiving platen, a movable platen disposed above the pressure-receiving platen and configured to be moved up and down by a mold opening and closing mechanism, and tie bars extending downward from the movable platen and penetrating the pressure-receiving platen and the traction platen. The mold clamping device is configured to clamp molds disposed between the pressure-receiving platen and the movable platen. Each tie bar has a tooth portion at its lower end that engages with a tooth portion of a half nut connected to an underside of the traction plate. An injection device arranged on the movable platen includes a heating cylinder having a screw for feeding resin material through a nozzle to an upper one of the molds, and a purging cover encloses a space between the lower end portion of the heating cylinder and the movable platen.

6 Claims, 12 Drawing Sheets

(56) References Cited

U.S. PATENT DOCUMENTS

| | | | | |
|---|---|---|---|---|
| 2002/0180132 A1* | 12/2002 | Kubota | ............... | B29C 45/6728 |
| | | | | 269/32 |
| 2005/0025856 A1* | 2/2005 | Nishino | .............. | B29C 45/6728 |
| | | | | 425/589 |
| 2014/0120193 A1* | 5/2014 | Maruyama | .......... | B29C 45/1751 |
| | | | | 425/150 |

FOREIGN PATENT DOCUMENTS

| | | |
|---|---|---|
| DE | 2016006956 | 12/2016 |
| FR | 2355647 | 1/1978 |
| JP | 2012157979 | 8/2012 |

OTHER PUBLICATIONS

English-language machine translation of Japanese Utility Model Application After Examination of Publication No. 07-017451, Puclication Date Apr. 26, 1995.

* cited by examiner

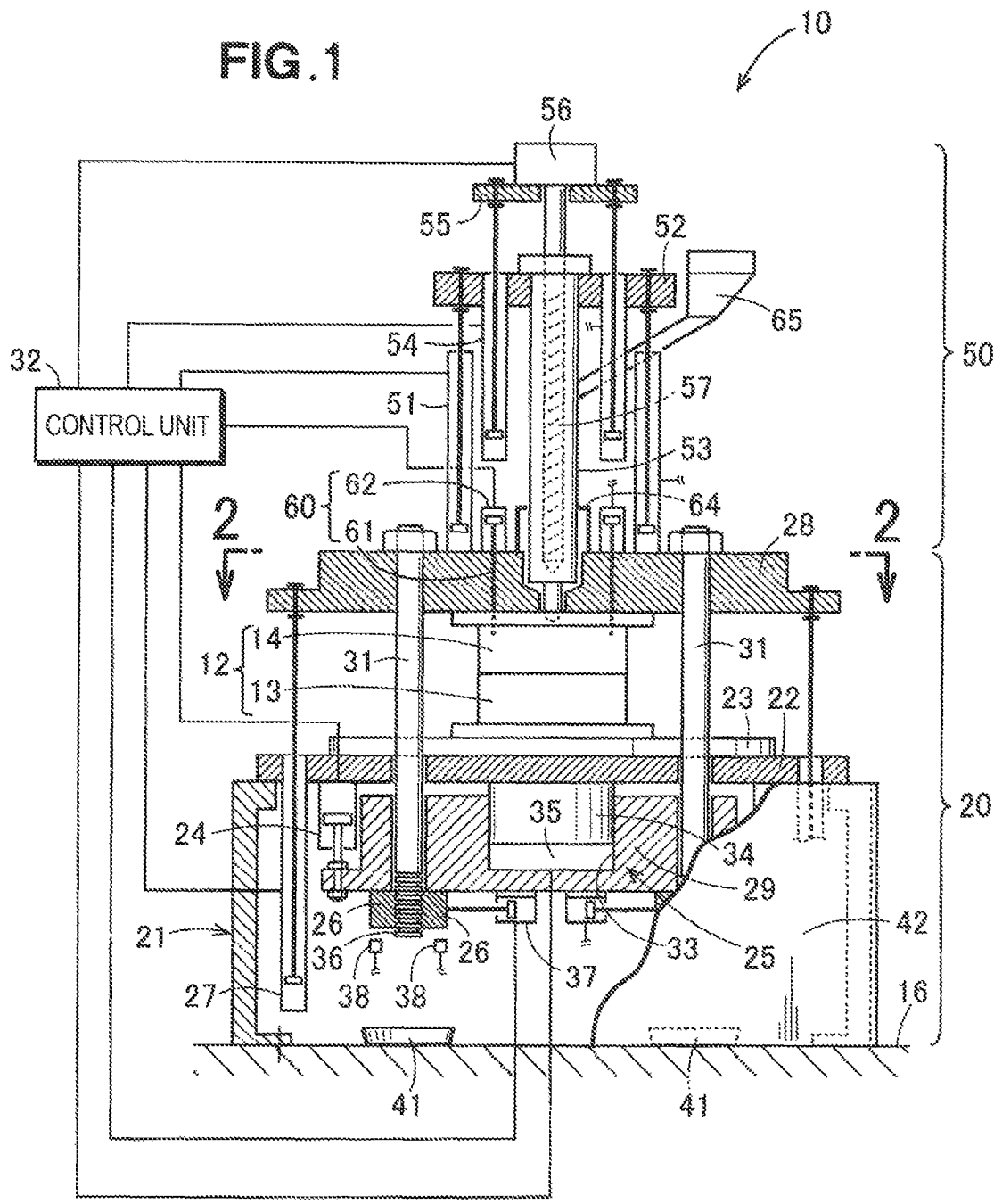

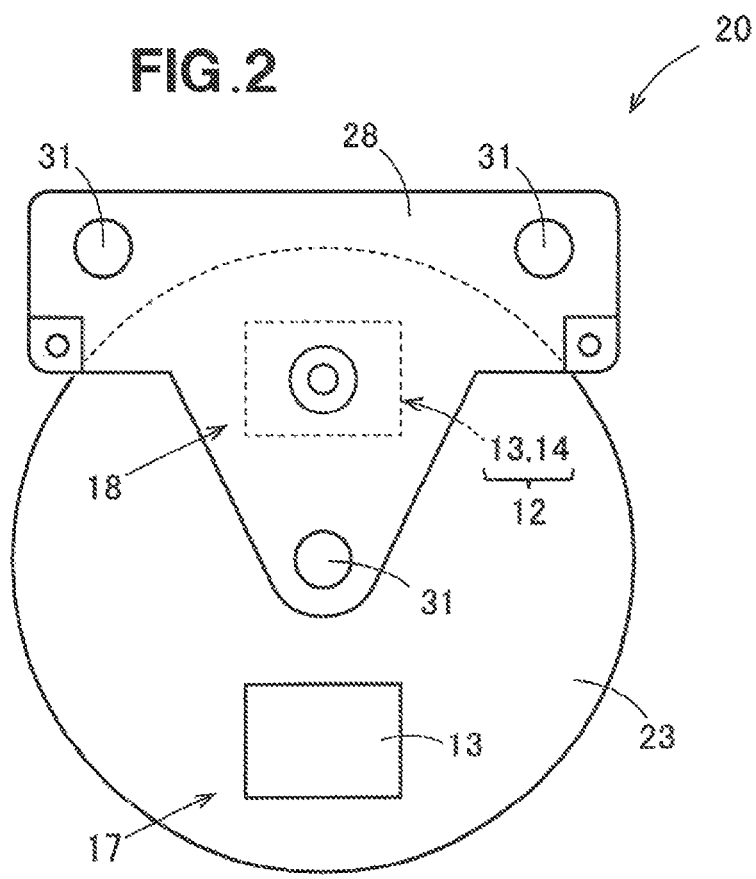

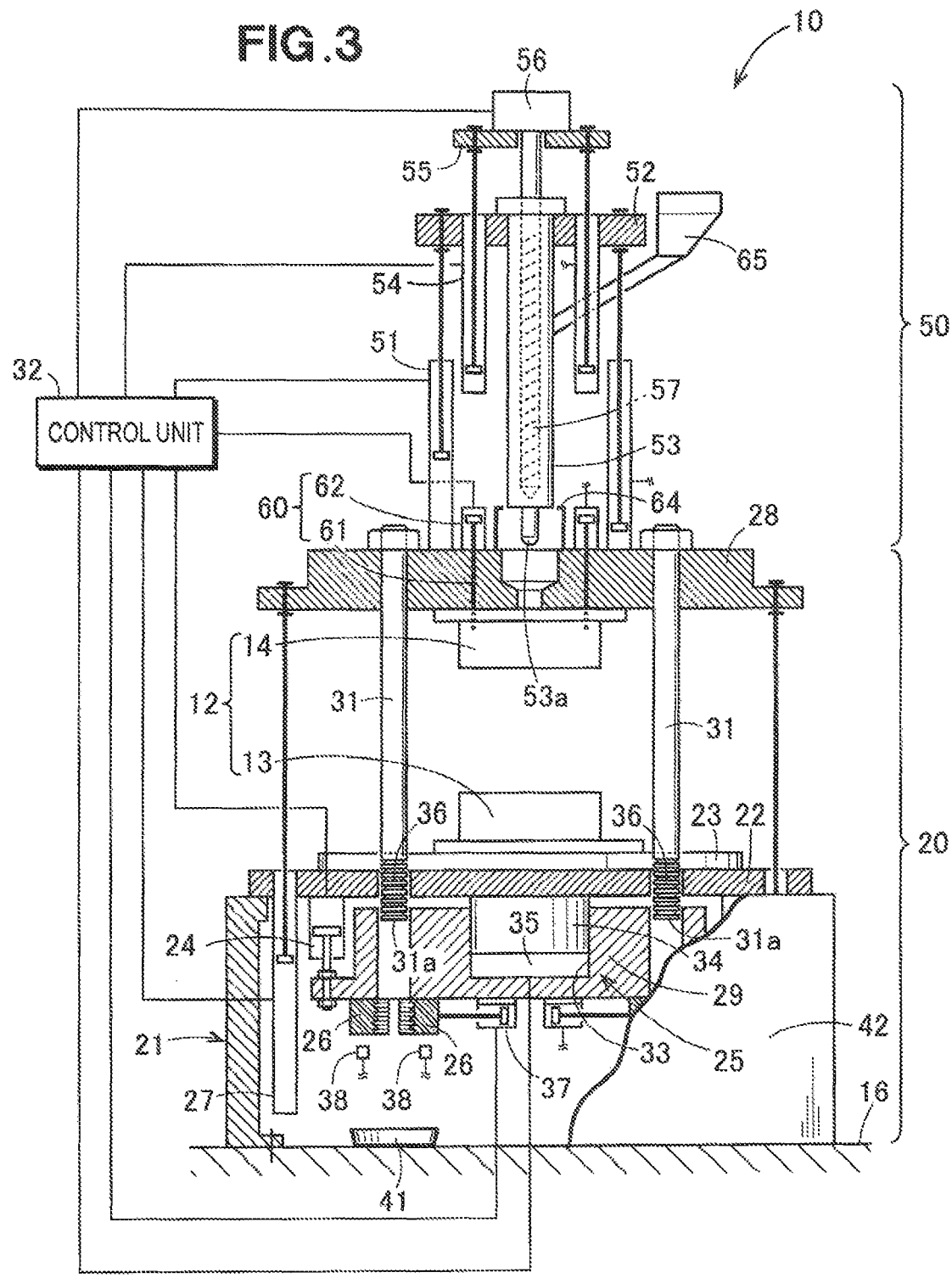

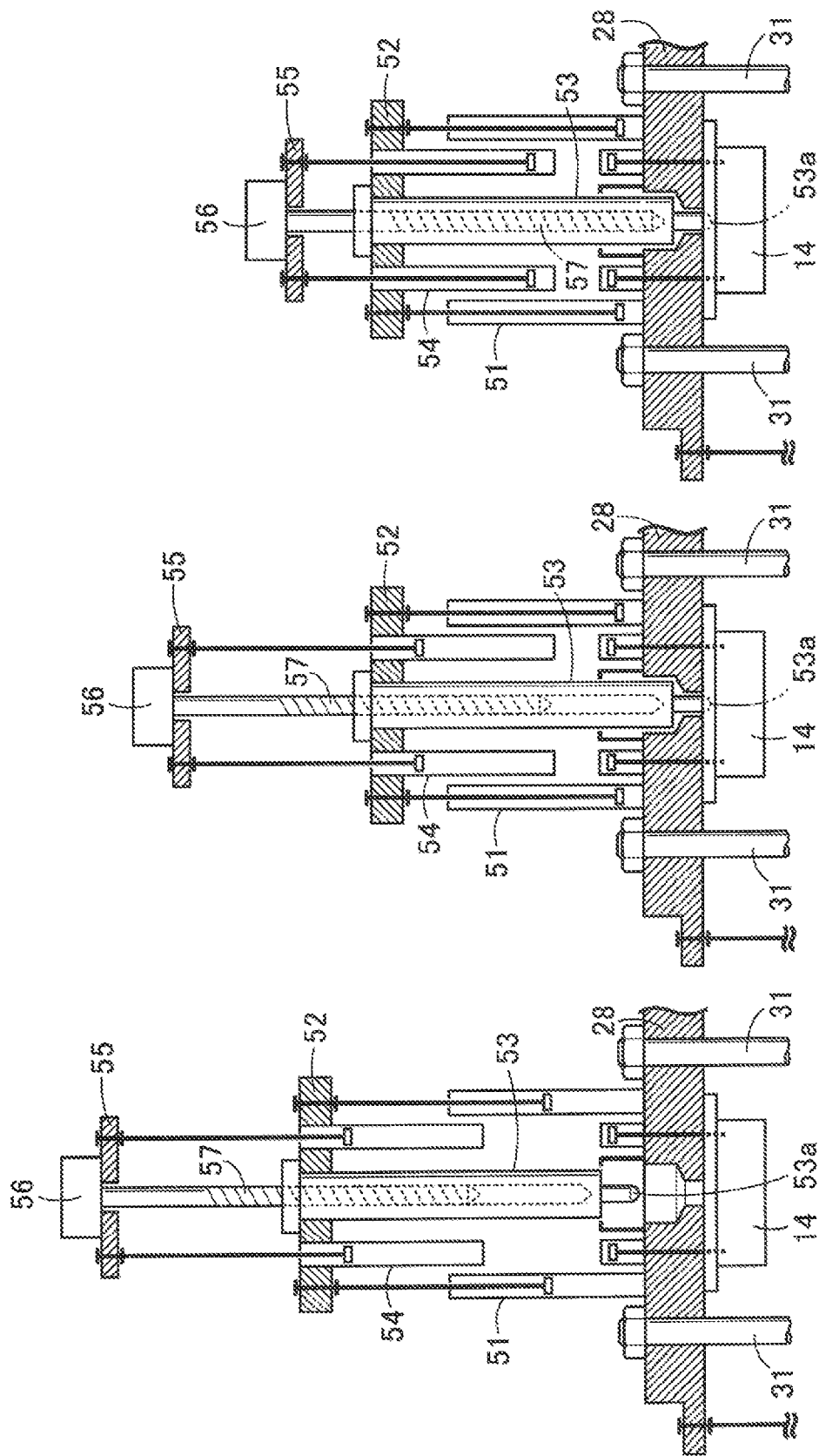

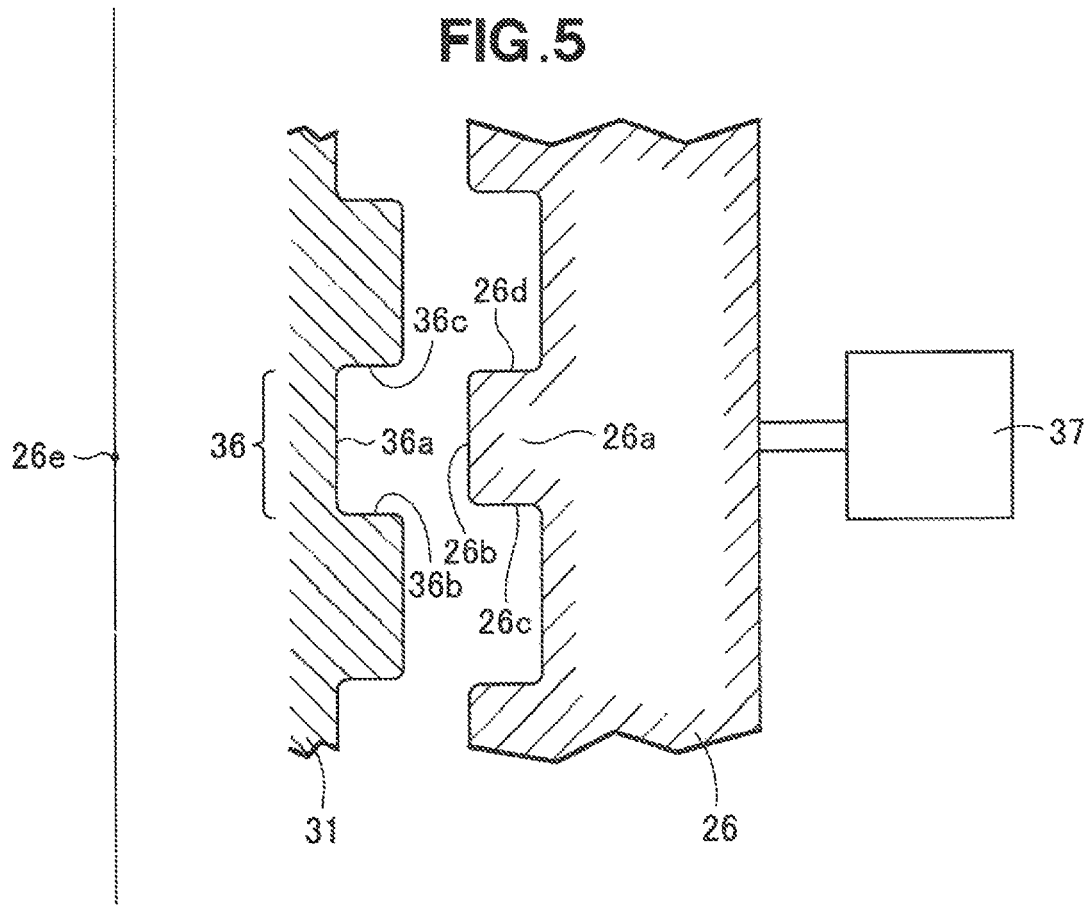

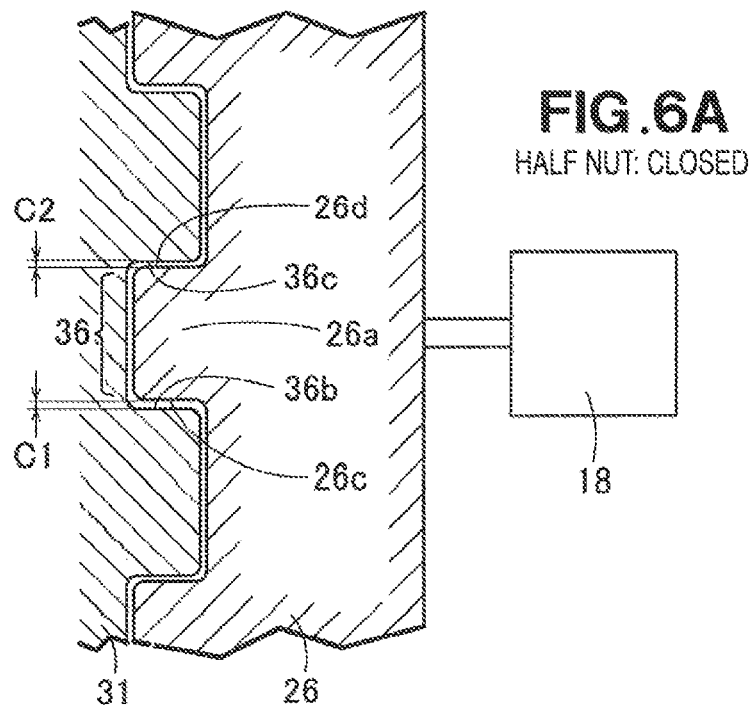
FIG.6A
HALF NUT: CLOSED
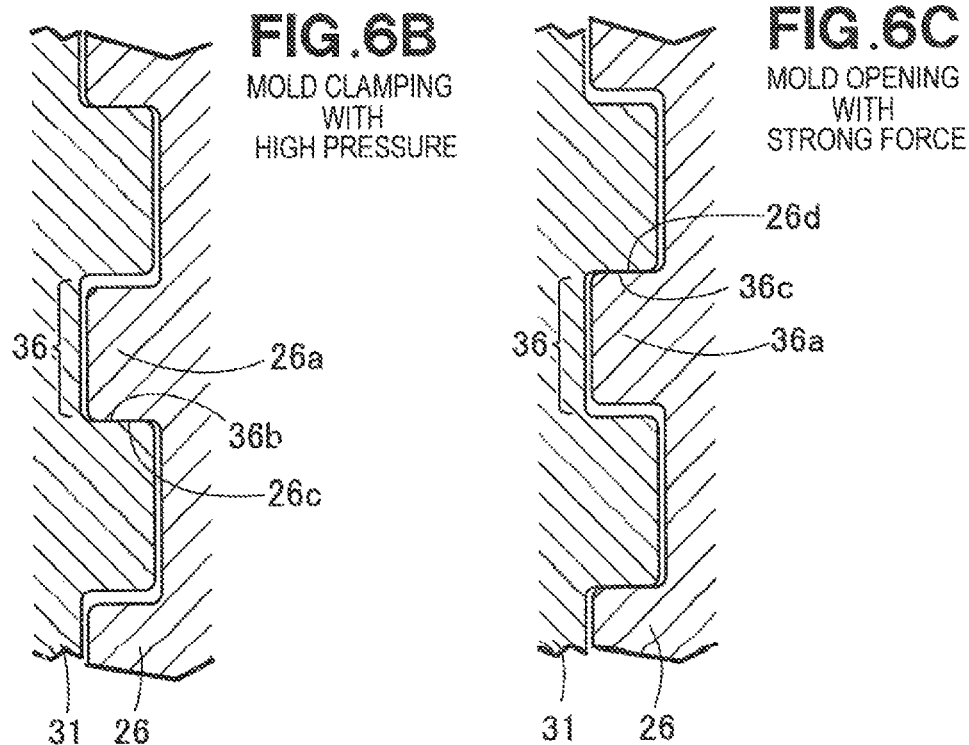
FIG.6B
MOLD CLAMPING WITH HIGH PRESSURE
FIG.6C
MOLD OPENING WITH STRONG FORCE

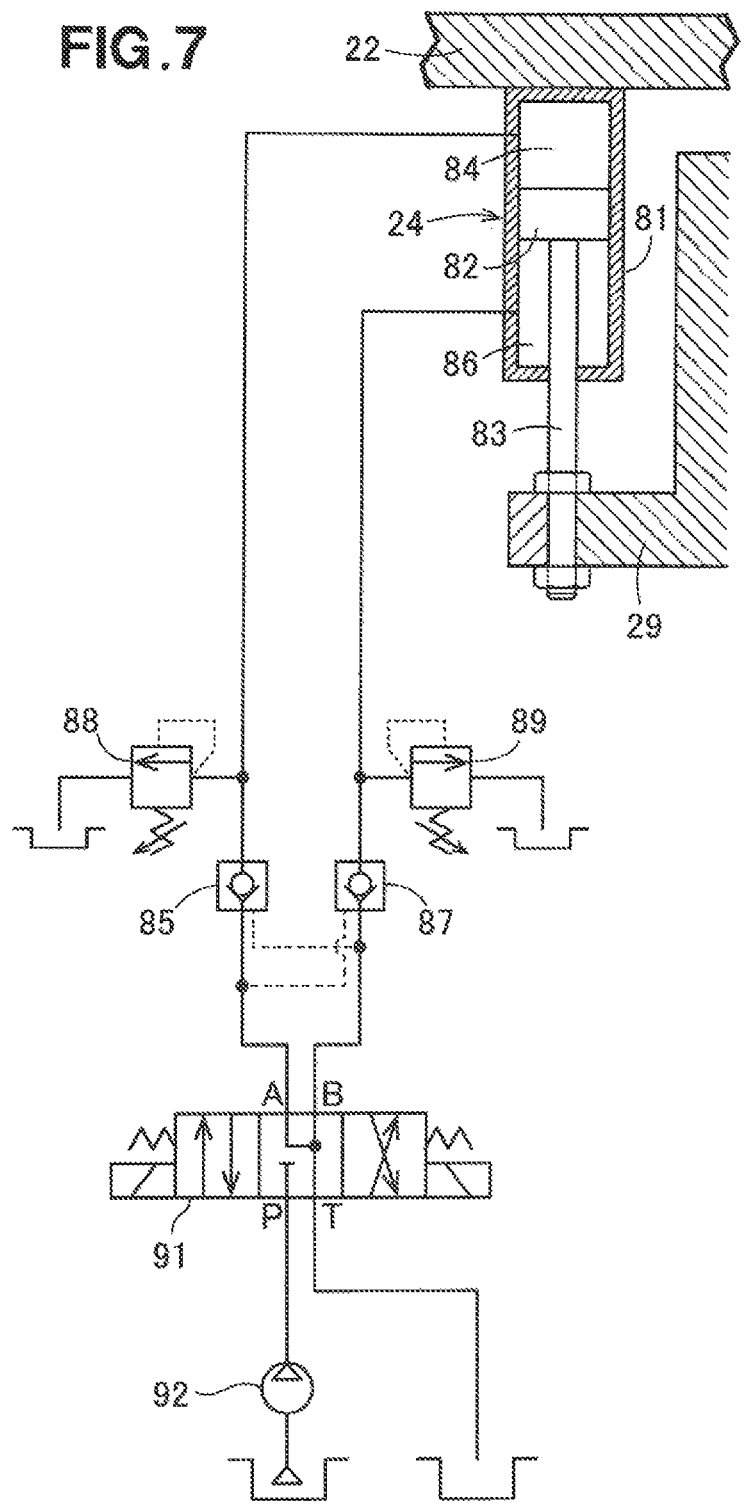

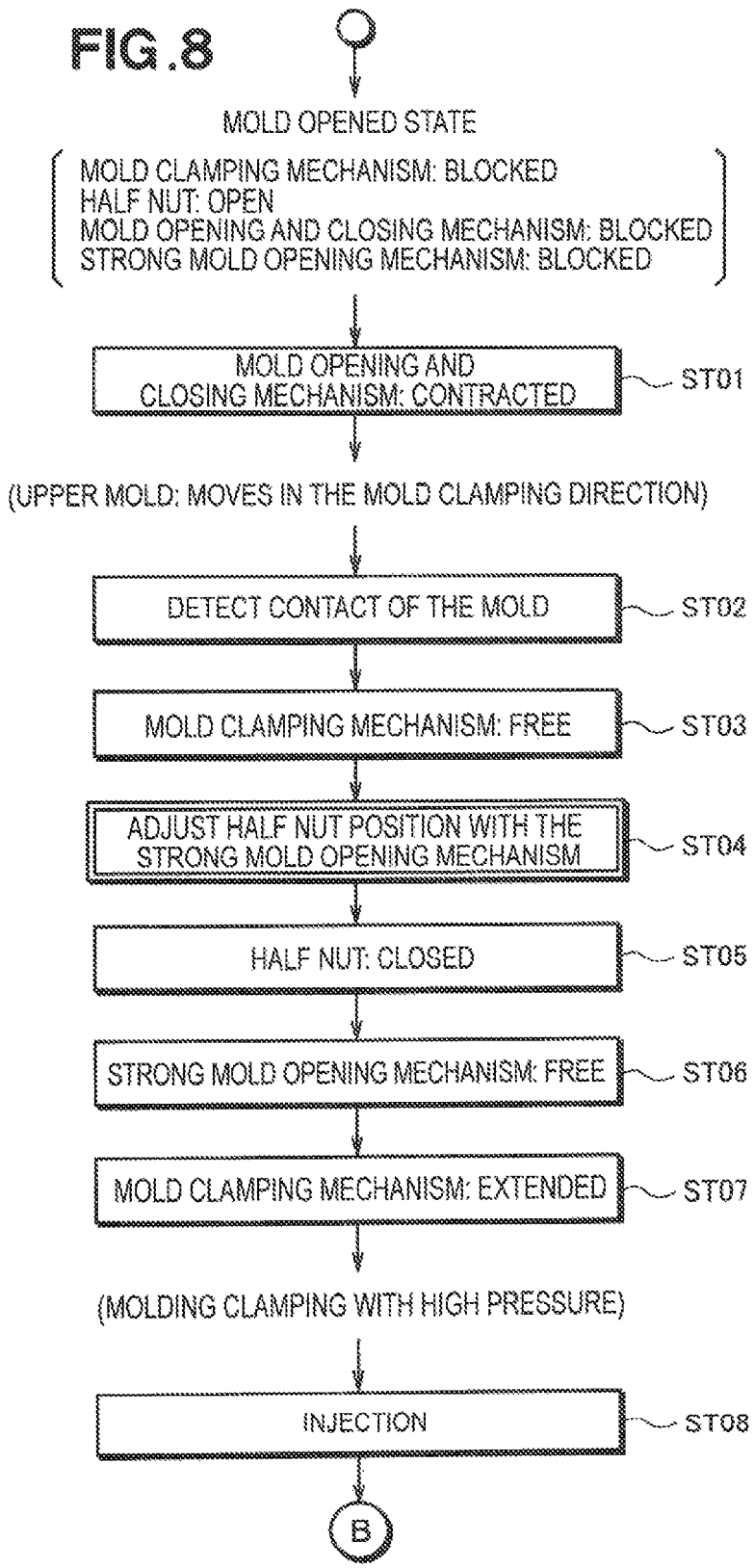

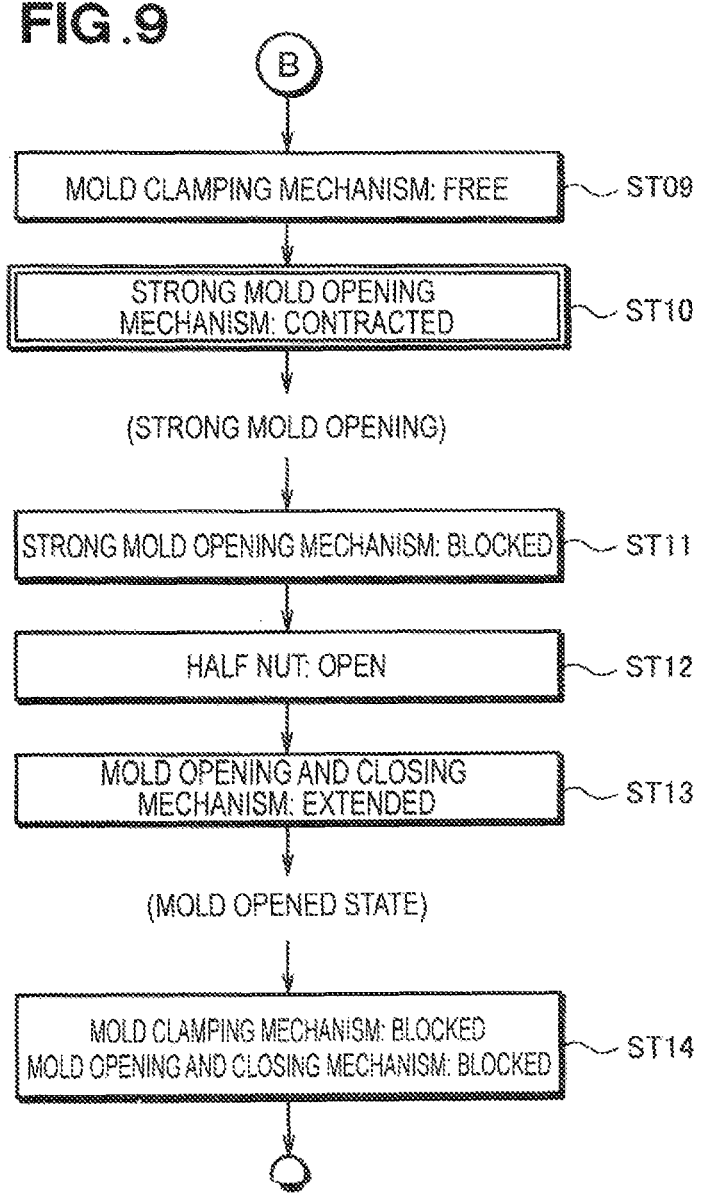

MOLD CLAMPING DEVICE HAVING A HALF NUT AND INJECTION MOLDING APPARATUS

FIELD OF THE INVENTION

The present invention relates to a mold clamping device having a half nut, and also relates to an injection molding apparatus including the mold clamping device.

BACKGROUND OF THE INVENTION

Injection molding apparatuses for injection molding resin to make resin-molded articles have become widespread. The injection molding apparatus includes a mold clamping device for clamping metal molds, and an injection device for injecting a resin material into the metal molds. Metal molds are simply referred to as "molds" hereinafter.

The molds (mold pair) include a fixed mold (stationary mold) and a movable mold. As the movable mold is moved relative to the stationary mold along a mold clamping axis, the molds are opened and closed.

A mold clamping device that has a mold clamping axis extending horizontally and a mold clamping device that has a mold clamping axis extending vertically are widely used in practice.

A mold clamping device that has a mold clamping axis extending vertically is known as disclosed in, for example, Japanese Patent Application Laid-Open Publication No. Sho 60-224517, and Japanese Utility Model Application, After-Examination Publication No. Hei 7-17451.

Japanese Patent Application Laid-Open Publication No. Sho 60-224517 discloses a mold clamping device in which an upper mold plate is disposed on a lower mold plate. An upper mold ejector plate is disposed on the upper mold plate, and an upper mold ejector pin extends downward from the upper mold ejector plate.

The upper mold ejector pin extends through the upper mold plate and reaches the vicinity of a gate such that the upper mold ejector pin serves to push a runner down. Hereinafter, the upper mold ejector pin and a member adapted to drive the upper mold ejector pin are collectively referred to as an upper mold ejector. The member adapted to drive the upper mold ejector pin includes the upper mold plate, a cylinder for moving the pin, or the like.

The mold clamping device disclosed in Japanese Utility Model Application, After-Examination Publication No. Hei 7-17451 includes a substrate supported by a base, a lower mounting plate disposed on the substrate, an upper mounting plate disposed on the lower mounting plate, and a tie bar extending upward from the substrate. The molds are clamped between the lower mounting plate and the upper mounting plate.

A saw tooth portion is provided on an upper portion of the tie bar, and a half nut engages with the saw tooth portion. The half nut is disposed on the upper mounting plate. The half nut is opened and closed by a half nut opening and closing cylinder which is disposed on the upper mounting plate.

The mold clamping device of Japanese Utility Model Application, After-Examination Publication No. Hei 7-17451 has an advantage that the height of the device can be smaller because the half nut is employed.

Here, an attempt will be made to provide the upper mold ejector disclosed in Japanese Patent Application Laid-Open Publication No. Sho 60-224517 on the upper mounting plate of Japanese Utility Model Application, After-Examination Publication No. Hei 7-17451. In this attempt, however, the upper mold ejector plate interferes with the half nut and the half nut opening and closing cylinder.

As a consequence, the upper mold ejector cannot be provided in the mold clamping device of Japanese Utility Model Application, After-Examination Publication No. Hei 7-17451.

In recent years, it has been demanded to remove runners remaining in the molds quickly. Therefore, it is desired that even a mold clamping device that has the half nut will have a structure in which the upper mold ejector can be disposed on the upper mounting plate.

Further, it is desired that the half nut of Japanese Utility Model Application, After-Examination Publication No. Hei 7-17451 is greased periodically or at any time in order to lubricate between the metal surface of the half nut and the metal surface of the tie bar. The spent grease and excess grease fall from the half nut. As a result, the equipment placed below the half nut becomes dirty. The measures are required.

Further, in Japanese Utility Model Application, After-Examination Publication No. Hei 7-17451, the molds are opened by a boost cylinder.

It is known that the mold opening process requires a large force for opening the molds at the beginning of this process. When the movable mold is moved away from the fixed mold even slightly, the remaining mold opening process will be carried out with a small mold opening force thereafter.

In order to obtain a large mold opening force, it is necessary to increase the outer diameter of a piston of the boost cylinder and the outer diameter of a piston rod of the boost cylinder. This results in the increase of the boost cylinder diameter, and the increase of the weight of the boost cylinder.

In this state, the mold clamping device becomes heavy.

However, the weight reduction of the mold clamping device is desired. Thus, there is a demand for a mold clamping device that can perform a strong mold opening operation without increasing the axial force of the mold opening and closing mechanism (typical example of the mechanism is the boost cylinder).

SUMMARY OF THE INVENTION

It is an object of the present invention to provide a mold clamping device which can dispose an upper mold ejector or the like on an upper mounting plate (movable plate or platen) even if the mold clamping device employs a half nut, take measures against a drop of grease from the half nut, and can perform a strong mold opening operation without increasing the axial force of the mold opening and closing mechanism.

According to a first embodiment of the present invention, there is provided a mold clamping device that includes a bed, a pressure-receiving platen fixed to the bed, a traction platen disposed below the pressure-receiving platen, a movable platen disposed above the pressure-receiving platen and configured to be moved up and down by a mold opening and closing mechanism, and a tie bar (or tie bars) extending downward from the movable platen and penetrating the pressure-receiving platen and the traction platen, the tie bar has a saw tooth portion, and the traction platen has a half nut that engages with the saw tooth portion.

the mold clamping device is configured to clamp molds disposed between the pressure-receiving platen and the movable platen by lowering the traction platen and lowering the tie bar and the movable platen with the traction platen while the half nut is engaging with the saw tooth portion, the mold clamping device further includes a control unit for controlling a position of the traction platen and the mold opening and closing mechanism, a strong mold opening mechanism for opening the molds at an initial stage of a mold opening process spans the pressure-receiving platen and the traction platen, the strong mold opening mechanism has a larger axial force and a shorter stroke than the mold opening and closing mechanism, the control unit also controls opening and closing of the half nut and the strong mold opening mechanism, and adjusts a position of the half nut such that the half nut is synchronized with the saw tooth portion by the strong mold opening mechanism, and the saw tooth portion is formed at a lower end of each tie bar, and the half nut is disposed under the traction platen.

The pressure-receiving platen is disposed below the movable platen, the traction platen is be disposed below the pressure-receiving platen, and the half nut is disposed below the traction platen. Since there is space over the movable platen, the upper mold ejector or the like can be easily arranged on the movable platen.

That is, even if the mold clamping device employs the half nut, a structure capable of disposing the upper mold ejector or the like on the movable platen is provided.

In addition, although the half nut itself is a heavy object of about 50 kg, the center of gravity of the mold clamping device can be lowered because this heavy object is arranged below the lowermost traction platen, not on the uppermost movable platen. Although the movable platen is lifted and lowered by the mold opening and closing mechanism, there is no half nut on the movable platen. Accordingly, the load on the mold opening and closing mechanism can be reduced, and the consumption of energy for driving the mold opening and closing mechanism can be reduced.

Incidentally, lubrication by grease or the like is applied between the half nut and the saw tooth portion, and excess grease and waste grease (hereinafter referred to as waste grease) inevitably fall.

If the half nut is present on the movable platen (upper mounting plate), the waste grease falls on the molds under the movable platen, and a product (resin molded article) and the like are soiled.

In this respect, the half nut is disposed at the lowest position in the present invention, and therefore the products and the like are not soiled by the waste grease.

If the half nut is present on the movable platen (upper mounting plate), the tie bar penetrates the movable platen and protrudes above the movable platen. Because of the protrusion, the mold clamping device becomes higher correspondingly.

In this respect, the tie bar extends downward from the movable platen in the present invention. In other words, the tie bar does not protrude upward from the movable platen. As a result, the height of the mold clamping device can be small.

Since the strong mold opening mechanism is provided separately from the mold clamping mechanism, the mold clamping mechanism can have a simple structure and is low in cost. In addition, the strong mold opening mechanism spans the movable platen and the mold clamping mechanism which move substantially together. The strong mold opening mechanism requires a small stroke and becomes compact.

In addition, since the strong mold opening mechanism also serves as a half nut position adjusting mechanism for finely adjusting the position of the half nut, it has a large added value. In other words, an independent half nut position adjustment mechanism is not required.

As described above, the present invention provides a mold clamping device that can dispose the upper mold ejector or the like on the upper mounting plate (movable platen), deal with the fall of grease from the half nut, and perform the strong mold opening operation without increasing the axial force of the mold opening and closing mechanism, even if the mold clamping device employs the half nut.

Preferably, the teeth of the half nut are rectangular teeth, and the saw tooth portion is a rectangular groove corresponding to the rectangular teeth.

Each of the rectangular teeth has a peripheral surface parallel to the longitudinal axis of the half nut, a first tooth surface extending from one end of the peripheral surface and perpendicular to the longitudinal axis, and a second tooth surface extending from the other end of the peripheral surface and perpendicular to the longitudinal axis.

Each of the circumferential grooves has a groove bottom parallel to the longitudinal axis of the tie bar, a first side surface extending to one end of the groove bottom and perpendicular to the longitudinal axis, and a second side surface extending to the other end of the groove bottom and perpendicular to the longitudinal axis.

At the time of mold clamping, the first tooth surface is in close contact with the associated first side surface. At the time of strong mold opening, the second tooth surface is in close contact with the associated second side surface. Since the first tooth surface and the second tooth surface are both orthogonal to the longitudinal axis, the mechanical coupling force between the half nut and the tie bar can be sufficiently enhanced.

Preferably, a lower end face of the tie bar is received in the traction platen when the molds are opened to the maximum.

According to the present invention, the tie bar can be shortened as compared with the configuration in which the lower end face of the tie bar protrudes downward from the traction platen when the molds are opened to the maximum (maximum mold open state). If the tie bar is short, weight reduction and cost reduction of the mold clamping device can be achieved.

Preferably, the bed is enclosed by a cover, the half nut is housed in the cover, and a half nut movement monitoring mechanism for monitoring the movement of the half nut is provided in the cover.

Since the bed is surrounded by the cover, the appearance of the mold clamping device can be improved. On the other hand, it has become difficult to visually inspect the half nut.

In the present invention, since the movement of the half nut is monitored by the half nut movement monitoring mechanism, the visual inspection becomes unnecessary, and the stable operation of the mold clamping device is maintained.

According to a second embodiment of the present invention, there is provided an injection molding apparatus that includes a mold clamping device having the half nut of claim 1, and an injection device arranged vertically on the movable platen.

If the half nut is present on the movable platen (upper mounting plate) in the mold clamping device, the injection device (in particular, a heating cylinder) interferes with the half nut. This makes it difficult to dispose the injection device on the movable platen. If the half nut is disposed on the movable platen in spite of this, the structure around the movable platen becomes complicated.

In this respect, there is nothing on and above the movable platen in the present invention, the injection device can be easily arranged on the movable platen. In addition to the injection device, a purging cover and/or an upper mold ejector can be arranged on the movable platen.

BRIEF DESCRIPTION OF THE DRAWINGS

Hereinafter, some preferred embodiments of the present invention will be described in detail with reference to the accompanying drawings, in which, FIG. 1 shows an overall configuration of an injection molding apparatus according to an embodiment of the present invention, FIG. 2 is a view taken along the line 2-2 of FIG. 1, FIG. 3 is a view useful to describe the operation of the injection molding apparatus, FIG. 4A to FIG. 4C are diagrams useful to describe the operation of the injection device, which is an element of the injection molding apparatus, FIG. 5 is an enlarged cross-sectional view of teeth of the half nut and a saw tooth portion of a tie bar, FIG. 6A shows the half nut in a closed condition, FIG. 6B shows the half nut when the molds are clamped at high pressure, FIG. 6C shows the half nut when the strong mold opening process is carried out, FIG. 7 shows a structure of the strong mold opening mechanism, FIG. 8 is a control flow diagram from when the molds are in an open condition to when injection is carried out, FIG. 9 is a control flow diagram after the injection.

DETAILED DESCRIPTION OF THE PREFERRED EMBODIMENTS

Figure 10:
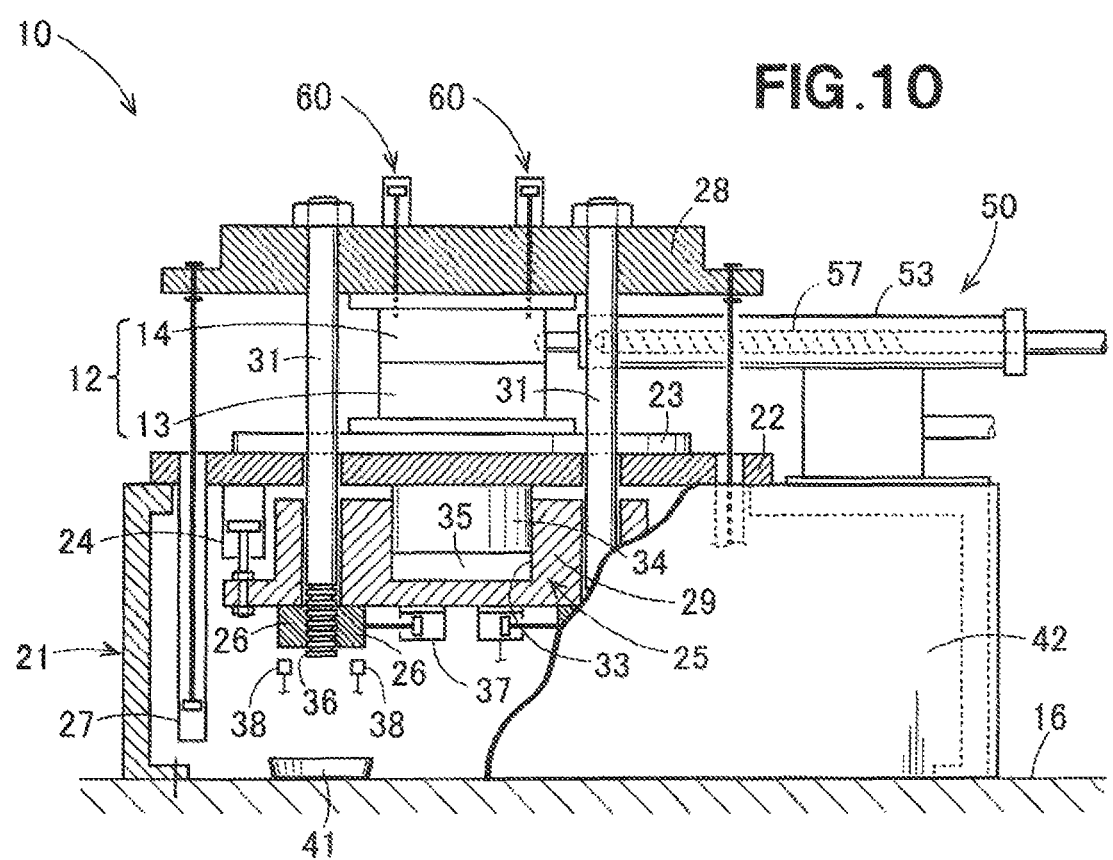
FIG. 10 is a diagram useful to describe a modification of the injection molding apparatus.

Embodiments of the present invention will be described below based on the accompanying drawings. It should be noted that when a cylinder is described, "extension" means that the entire length of the cylinder is extended by advancing a piston rod, and "contraction" means that the entire length of the cylinder is contracted by retracting the piston rod.

As shown in FIG. 1, the injection molding apparatus 10 is an apparatus that includes, as its main components, a mold clamping device 20 in which a mold clamping axis extends vertically and molds 12 are clamped, and an injection device 50 which is disposed vertically on the mold clamping device 20. The molds 12 include, for example, a lower mold 13 and an upper mold 14.

The mold clamping device 20 includes a bed 21, a pressure-receiving platen 22, a turntable 23, a strong mold opening mechanism (mechanism to open the molds with a strong force) 24, a mold clamping mechanism 25, a traction platen 29, a half nut 26, a mold opening and closing mechanism 27, a movable platen 28, tie bars 31, and a control unit 32.

The bed 21 is fixed to a floor or a frame 16.

The pressure-receiving platen 22 is fixed to the bed 21. The pressure-receiving platen 22 can be removed from the bed 21 by loosening (untightening) bolts and the like. Thus, the term "fixing" or "fastening" in the embodiment of the present invention includes not only complete fixings or fastening but also a detachably coupled condition.

The turntable 23 is mounted on the pressure-receiving platen 22.

The strong mold opening mechanism 24 spans the pressure-receiving platen 22 and the traction platen 29. A preferred structure of the strong mold opening mechanism 24 will be described in detail with reference to FIG. 7, which will be described later. The strong mold opening mechanism 24 may span the bed 21 and the traction platen 29.

The mold clamping mechanism 25 is a mechanism configured to move the traction platen 29 relative to the pressure-receiving platen 22 in the mold clamping direction. The mold clamping mechanism 25 is preferably a hydraulic cylinder 33 which opens upward. The hydraulic cylinder 33 accommodates a piston portion 34 extending downward from the pressure-receiving platen 22. A pressure oil chamber 35 is formed between the hydraulic cylinder 33 and the piston portion 34. As the pressure oil is supplied to the pressure oil chamber 35, the traction plate 29 is lowered.

The half nut 26 is arranged under the traction platen 29 and is attached to the traction platen 29.

The mold opening and closing mechanism 27 spans the pressure-receiving platen 22 and the movable platen 28. The mold opening and closing mechanism 27 is preferably a hydraulic cylinder. The mold opening and closing mechanism 27 may span the bed 21 and the movable platen 28.

The movable platen 28 is disposed above the pressure-receiving platen 22, and is move up and down by, the mold opening and closing mechanism 27.

Each of the tie bars 31 extends downward from the movable platen 28, and penetrates the pressure-receiving platen 22 and the traction platen 29. A saw tooth portion 36 is formed at the lower end of the tie bar 31.

The half nut 26 is a half nut which engages with the saw tooth portion 36. The half nut 26 is opened and closed by a half nut opening and closing mechanism 37 provided on the traction platen 29. The half nut opening and closing mechanism 37 is preferably a hydraulic cylinder.

It is preferable that the teeth of the saw tooth portion 36 are arranged at equal pitches, which may look like bamboo knots. Each of the teeth may be of rectangular, trapezoidal, or triangular cross-section. The half nut 26 has corresponding teeth.

A preferred structure of the teeth of the half nut 26 and the saw tooth portion 36 will be described later in detail with reference to FIG. 5.

The tie bars 31 and the half nut 26 are made of tough and hard steel. Grease lubrication is provided between the saw tooth portion 36 and the half nut 26 to facilitate contact between the steel elements. At a position higher than the saw tooth portion 36, grease is supplied to the outer peripheral surface of each tie bar 31. The grease flows down and reaches the saw tooth portion 36. The greasing may be carried out either automatically or manually.

Preferably, a half nut movement monitoring mechanism 38 is provided in the vicinity of the half nut 26 to monitor the movement (operation) of the half nut 26. It should be noted, however, that the half nut movement monitoring mechanism 38 may be omitted on condition that the positional control of the mold opening/closing mechanism 27 and the strong mold opening mechanism 24 can be performed precisely.

The half nut movement monitoring mechanism 38 may be any sensor, such as a proximity switch or a limit switch. Among them, the proximity switch is a non-contact type sensor that determines that "there is an object" when a metallic object approaches within a certain distance (predetermined distance), and that "there is no object" when the metallic object becomes distant over the predetermined distance. The half nut 26 is wetted with waste grease, but if the sensor is a non-contact type sensor, false detection does not occur. Moreover, it is inexpensive. Therefore, the proximity switch is recommended.

The control unit 32 controls the strong mold opening mechanism 24, the mold clamping mechanism 25, the mold opening/closing mechanism 27, and the half nut opening/closing mechanism 37.

In addition, the control unit 32 controls an injection device moving mechanism 51, an injection mechanism 54, a screw rotating mechanism 56, and a pin moving mechanism 62.

Preferably, a tray 41 for receiving the waste grease is placed under the half nut 26 and on the floor 16. The tray 41 is a dish-shaped container. Periodically or from time to time, the tray 41 is pulled out and the accumulated waste grease is treated to prevent contamination on the floor 16.

Preferably, the bed 21 is surrounded by a cover 42. The cover 42 acts as a safety cover. By surrounding the bed 21 with the cover 42, the appearance of the mold clamping device 20 is improved. It should be noted, however, that the cover 42 is not indispensable because the cover may be replaced with a safety fence or the like.

The injection device 50 is arranged above the mold clamping device 20.

The injection device 50 includes the injection device moving mechanism 51 standing on the movable platen 28, an injection table 52 supported by the injection device moving mechanism 51, a heating cylinder 53 supported by the injection table 52 and extending downward, the injection mechanism 54 provided on the injection table 52 and having a piston rod extending upward, a screw drive table 55 supported by the injection mechanism 54, the screw rotating mechanism 56 supported by the screw drive table 55, and a screw 57 extending downward from the screw rotating mechanism 56 and entering the heating cylinder 53. The screw rotating mechanism 56 is a hydraulic motor, for example.

The injection device moving mechanism 51 is preferably a hydraulic cylinder, and the injection mechanism 54 is preferably a hydraulic cylinder.

More preferably, a purging cover 64 for surrounding the heating cylinder 53 may be provided on the movable platen 28. In addition, an upper mold ejector 60 may be provided on the movable platen 28. The upper mold ejector 60 includes an ejector pin 61, which extends to the upper mold 14, and a pin moving mechanism 62 for moving the ejector pin 61, and plays a role of pushing down a runner remaining in (on) the upper mold 14. The pin moving mechanism 62 is preferably a hydraulic cylinder.

FIG. 2 is a view taken along the line 2-2 in FIG. 1.

As shown in FIG. 2, the tie bars 31 are respectively disposed at the vertices of the triangle. One of the tie bars 31 defines a rotation center of the turntable 23.

The resin molded article or the product is taken out from the lower mold 13 at a product take-out position 17. The empty lower mold 13 is moved to a mold clamping position 18 by rotating the turntable 23 by 180°.

Since the product taking-out operation (product unloading operation) and the mold clamping operation can be performed in parallel, use of the turntable 23 increases the productivity.

It should be noted that the turntable 23 may be replaced with a slide platen that reciprocates between the mold clamping position 18 and the product taking-out position 17. In this configuration, it is desirable that the number of tie bars 31 is four.

Alternatively, the turntable 23 and/or the slide platen may be dispensed with. Also in this configuration, it is desirable that the number of tie bars 31 is four.

Therefore, when the mold clamping device 20 is used, the number of tie bars 31 can be freely decided. Further, use of the turntable 23 and use of the slide platen are not required in the mold clamping device 20.

In the mold clamping device 20 shown in FIG. 1, the half nut 26 is opened and separated from the saw tooth portion 36. Then, the mold opening and closing mechanism 27 is extended to lift the movable platen 28 upward. As the movable platen 28 moves up, the upper mold 14 is separated from the lower mold 13 and the tie bars 31 move up.

In addition, the injection device moving mechanism 51 of the injection device 50 is extended to move the injection table 52 upward. As the injection table 52 moves upward, the heating cylinder 53 moves away from the upper mold 14.

As described above, the maximum mold open state is obtained as shown in FIG. 3.

As shown in FIG. 3, the lower end face 31a of each of the tie bars 31 has risen to the inside of the traction platen 29. As a result, the tie bars 31 can be made sufficiently short. The shorter the tie bars 31, the lighter the tie bars 31 and the savings in material can be achieved.

In the conventional technique, a structure in which the lower end faces 31a of the tie bars 31 always come out of the traction platen 29 is preferable. On the other hand, when the configuration of FIG. 3 is employed, the tie bars 31 can be greatly shortened.

The heating cylinder 53 may be moved up to perform a purging operation for discharging the accumulated resin material. This purging operation is also referred to as a discarding shot process. In the discarding shot process, the resin material flies out from the nozzle 53a, but is prevented from spreading by the purging cover 64. The operator opens the purging cover 64 at any time or as appropriate, and takes out the accumulated resin material.

According to the embodiment of the present invention, there is sufficient space above the movable platen 28, and therefore the purging cover 64 surrounding the nozzle 53a can be easily disposed on the movable platen 28.

In the injection molding apparatus 10, the operation of the mold clamping device 20 and the operation of the injection device 50 are performed in parallel.

Firstly, the operation of the mold clamping device 20 will be described.

In FIG. 3, the mold opening and closing mechanism 27 is contracted to lower the movable platen 28, the upper mold 14, and the tie bars 31. When the upper mold 14 hits the lower mold 13, the lowering of the tie bars 31 and the associated parts is completed.

There is a phase shift between the saw tooth portion 36 and the half nut 26. The traction platen 29 is slightly moved up and down by the strong mold opening mechanism 24 so that this phase shift becomes zero. This moving up and down is referred to as synchronization. When the synchronization is completed, the half nut opening and closing mechanism 37 is extended to cause the half nut 26 to mesh with the saw tooth portion 36.

If the meshing between the half nut 26 and the saw tooth portion 36 is not in a good condition, this fact is detected by the half nut movement monitoring mechanism 38. If the meshing is not in a good condition, the injection molding operation is interrupted and countermeasures are taken.

If a bad condition is not detected in the meshing between the half nut 26 and the saw tooth portion 36, the pressure oil is supplied to the pressure oil chamber 35 of the mold clamping mechanism 25 in FIG. 1. As a result, the traction platen 29 is lowered, the tie bars 31 are lowered, and the movable platen 28 is lowered. Thus, the molds 12 are clamped.

Next, the operation of the injection device 50 will be described with reference to FIG. 3 and FIG. 4A to FIG. 4C.

In FIG. 3, the screw 57 is rotated in a predetermined direction at a predetermined speed by the screw rotating mechanism 56. The resin material is supplied to the heating cylinder 53 through a hopper 65. The resin material descends through the groove of the screw 57. The resin material is kneaded to become a plastic state.

The resin material is accumulated in the heating cylinder 53 under the screw 57. The screw 57 gradually rises due to a reaction force from the accumulated resin material. A value obtained by multiplying the cross-sectional area of the screw 57 by the amount of movement of the screw becomes a measured value. When the measured value reaches a predetermined value, the plasticizing and measuring process is finished.

FIG. 4A shows when the plasticizing and measuring process is completed. In FIG. 4A, the injection device moving mechanism 51 is contracted.

As shown in FIG. 4B, the nozzle 53a hits the predetermined position of the upper mold 14. Subsequently, the injection mechanism 54 is contracted to move the screw 57 forward (down).

As shown in FIG. 4C, the resin material is injected into the upper mold 14 by the screws 57 which moves forward.

Now, the shape of the teeth of the half nut 26 and the shape of the saw tooth portion 36 of each of the tie bars 31 will be described with reference to FIG. 5.

As shown in FIG. 5, the teeth of the half nut 26 are rectangular teeth 26a. Each of the rectangular teeth 26a has a peripheral surface 26b parallel to the longitudinal axis 26e of the half nut 26, a first tooth surface 26c extending from one end of the peripheral surface 26b and perpendicular to the longitudinal axis 26e, and a second tooth surface 26d extending from the other end (opposite end) of the peripheral surface 26b and perpendicular to the longitudinal axis 26e.

The saw tooth portion 36 on the tie bar 31 defines a plurality of rectangular grooves or recesses, each having a groove bottom 36a parallel to the longitudinal axis 26e, a first side surface 36b extending from one end of the groove bottom 36a and perpendicular to the longitudinal axis 26e, and a second side surface 36c extending from the other end of the groove bottom 36a and perpendicular to the longitudinal axis 26e.

Each of the rectangular teeth 36a is a tooth having a rectangular cross section.

If each of the teeth of the half nut 26 has a triangular cross section or a trapezoidal cross section, the tooth flank inclines relative to the longitudinal axis 26e. This inclination converts a part of the axial force into a radial force, and the radial force causes the half nut 26 to open.

In this respect, the half nut 26 is not opened in the embodiment present invention because each of the teeth has a rectangular cross section.

It should be noted that the teeth of the half nut 26 are preferably rectangular teeth 26a having a rectangular cross section, but the strong mold opening force can be set smaller than the mold clamping force, so that the second teeth surfaces 26d and the second side surfaces 36c may be inclined. In other words, each of the teeth of the half nut 26 may have an asymmetric shape with a rectangular cross section in the lower half of the tooth in the drawing and a trapezoidal cross section or a triangular cross section in the upper half of the tooth. In this configuration, the saw tooth portion 36 may also have an asymmetric shape corresponding to the teeth of the half nut 26.

As shown in FIG. 6A, when the half nut 26 is closed after synchronization, the rectangular teeth 26a engage with the saw teeth 36. Since the position of the half nut 26 is adjusted, a gap C1 exists between the first side surface 36b and the first tooth surface 26c, and a gap C2 exists between the second side surface 36c and the second tooth surface 26d. The gap C1 and the gap C2 are the same (including substantially the same). Since the gaps C1 and C2 are present, the closing operation of the half nut 26 is smoothly performed.

In FIG. 1, when high-pressure oil is supplied to the pressure oil chamber 35, the traction platen 20 is lowered, and the half nut 26 is lowered together with the traction platen 29. As the half nut 26 is lowered, the tie bars 31 are lowered, and the upper mold 14 is clamped to the lower mold 13 with high pressure.

Since the half nut 26 is lowered relative to the tie bars 31, the first tooth surfaces 26c come into contact with the first side surfaces 36b as shown in FIG. 6B.

At the initial stage of the mold opening process, the strong mold opening mechanism 24 is contracted in FIG. 1. Then, the traction platen 29 moves upward, and the half nut 26 moves upward together with the traction platen 29. As the half nut 26 moves upward, the tie bars 31 are pulled up, and the upper mold 14 is lifted up and separated from the lower mold 13. In other words, a strong mold opening operation is performed.

Since the half nut 26 moves upward relative to the tie bars 31, the second tooth surfaces 26d abut against the second side surfaces 36c as shown in FIG. 6C.

Since the second side surfaces 36c and the second tooth surfaces 26d are orthogonal to the longitudinal axis 26e in FIG. 5, the force is transmitted only along the longitudinal axis. The same applies to FIG. 6B.

In other words, in either of FIG. 6B and FIG. 6C, a force in the radial direction (rightward direction in FIG. 6B) is not applied to the half nut 26. Since no radial force is applied to the half nut 26, the half nut 26 does not open.

Now, a specific example of the structure of the strong mold opening mechanism 24 will be described with reference to FIG. 7.

As shown in FIG. 7, the strong mold opening mechanism 24 is, for example, a hydraulic cylinder that includes a cylinder 81 fixed to the pressure-receiving platen 22, a piston 82 received in the cylinder 81, and a piston rod 83 extending from the piston 82.

The piston rod 83 is mechanically connected (coupled) to the traction platen 29. It should be noted that the cylinder 81 may be provided on the traction platen 29, and the piston rod 83 may be connected to the pressure-receiving platen 22.

The outer diameter of the piston 82 and the outer diameter of the piston rod 83 are sufficiently large. As a result, the axial force of the strong mold opening mechanism 24 is much larger than the axial force of the mold opening and closing mechanism 27 shown in FIG. 1. On the other hand, the mold opening and closing mechanism 27 has a large stroke, and the strong mold opening mechanism 24 has a remarkably small stroke.

Next, four operating modes (modes a to d) of the strong mold opening mechanism 24 will be described.

Modus a: When a directional control valve 91 is switched such that a port P and a port A communicate with each other, the oil from a hydraulic pump 92 is supplied to a first oil chamber 84 through a first check valve 85. At the same time, the pilot pressure causes a second check valve 87 to open. A port B communicates with a port T, and the oil in the second oil chamber 86 is discharged through the second check valve 87. As a result of these operations, the strong mold opening mechanism 24 is extended.

Modus b: When the directional control valve 91 is switched such that the port P and the port B communicate with each other, and the port A and the port T communicate with each other, the strong mold opening mechanism 24 is contracted.

Modus c: When the directional control valve 91 is switched such that the port P is closed, the ports A and B communicate with the port T, and the first check valve 85 and the second check valve 87 are closed, the oil in the first oil chamber 84 is prevented from flowing out by the first check valve 85, and the oil in the second oil chamber 86 is prevented from flowing out by the second check valve 87. In this condition, the piston 82 does not move. If the oil pressure in the first oil chamber 84 is equal to or smaller than a predetermined value, a first relief valve 88 remains closed. If the oil pressure in the second oil chamber 86 is equal to or smaller than a predetermined value, a second relief valve 89 remains closed. The piston 82 does not move because the first relief valve 88 and the second relief valve 89 are closed. That is, the strong mold opening mechanism 24 is in a "blocked" state.

Modus d: When an external force is applied to the piston rod 83 in the state of modus c, and, for example, the oil pressure in the first oil chamber 84 exceeds the predetermined value, the first relief valve 88 opens and the piston 82 moves. When the oil pressure in the second oil chamber 86 exceeds the predetermined value, the second relief valve 89 opens, and the piston 82 moves. That is, the strong mold opening mechanism 24 is in a quasi "free" state.

The operation of the injection molding apparatus 10 configured as described above will be described with reference to FIG. 8.

In the mold open state shown in FIG. 3, the mold clamping mechanism 25 is in the blocked state, the half nut 26 is in the opened state, the mold opening and closing mechanism 27 is in the blocked state, and the strong mold opening mechanism 24 is in the blocked state.

In the ST01 (Step 01) shown in FIG. 8, the mold opening and closing mechanism is contracted. Then, the upper mold starts moving in the mold clamping direction.

When the upper mold contacts the lower mold (ST02), the mold clamping mechanism is freed (ST03).

The half nut is slightly moved by the strong mold opening mechanism so that the misalignment is corrected (ST04). In other words, the teeth of the half nut are synchronized with the saw tooth portion on the tie bar.

After synchronization, the half nut is closed (ST05).

Since one of the functions of the strong mold opening mechanism has been completed, the strong mold opening mechanism is freed (ST06, Modus d).

Subsequently, the mold clamping mechanism is extended (ST07). Then, the upper mold is strongly pushed to the lower mold, and a high-pressure mold clamping state is achieved. In this condition, injection is performed (ST08).

When the resin material solidifies, the mold clamping mechanism is freed in preparation for strong mold opening (ST09 in FIG. 9).

The next step is the initial stage of mold opening, i.e., the strong mold opening mechanism is contracted to perform a strong mold opening process (ST10).

This completes the second actuation of the strong mold opening mechanism.

Thereafter, the strong mold opening mechanism is blocked (ST11), the half nut is opened (ST12), and the mold opening and closing mechanism is extended to perform the remaining mold opening process (ST13).

In the mold open state, the mold clamping mechanism is brought into the blocked state, and the mold opening and closing mechanism is brought in the blocked state (ST14). After that, the processing returns to FIG. 8.

In the mold clamping device 20 described with reference to FIG. 1, the pressure-receiving platen 22 is arranged below the movable platen 28, the traction platen 29 is arranged below the pressure-receiving platen 22, and the half nut 26 is arranged below the traction platen 29. Since there is space over the movable platen 28, the upper mold ejector 60 and other component(s) can be easily arranged on the movable platen 28.

As a result, even when the mold clamping device 20 employs the half nut 26, a structure capable of disposing the upper mold ejector 60 and other component(s) on the movable platen 28 is provided.

In addition, the half nut 26 itself is a heavy component having a weight of about 50 kg, but this heavy component is disposed under the lowermost traction platen 29, not under (or on) the uppermost movable platen 28. Therefore, the center of gravity of the mold clamping device 20 can be lowered.

The movable platen 28 is lifted and lowered by the mold opening and closing mechanism 27, but the half nut 26 is not provided on the movable platen 28. Therefore, the load on the mold opening and closing mechanism 27 can be reduced, and the consumption of electrical energy and/or other energy for generating hydraulic pressure to drive the mold opening and closing mechanism 27 can be reduced.

Lubrication by grease or the like is applied between the half nut 26 and the saw tooth portion 36, and waste grease inevitably falls.

If the half nut 26 is present on the movable platen 28, the waste grease drops over the molds 12 under the movable platen 28, and the product (resin molded article) or the like becomes dirty.

In this respect, the half nut 26 is disposed at the lowermost position in the embodiment of the present invention. Therefore, the product and the like are not soiled by the waste grease.

If the half nut 26 is present on the movable platen 28, the tie bars 31 penetrate the movable platen 28 and protrude above the movable platen 28. Because of the protrusion, the mold clamping device 20 has a large height inevitably.

In this respect, the tie bars 31 extend downward from the movable plate 28 in the embodiment of the present invention. In other words, the tie bars 31 do not protrude upward from the movable platen 28. As a result, the mold clamping device 20 has a small height.

As described with reference to FIG. 3, the lower end faces 31a of the tie bars 31 are received in the traction platen 29 when the molds are opened to the maximum. According to the embodiment of the present invention, the tie bars 31 can be shortened as compared with the configuration in which the lower end faces 31a of the tie bars 31 protrude downward from the traction platen 29 when the molds 12 are opened to the maximum. If the tie bars 31 are short, the weight reduction and cost reduction of the mold clamping device 20 can be achieved.

In addition, since the bed 21 is surrounded by the cover 42, the appearance of the mold clamping device 20 can be improved. On the other hand, it is difficult to visually inspect the half nut 26.

In the embodiment of the present invention, since the movement (operation) of the half nut 26 is monitored by the half nut movement monitoring mechanism 38, the visual inspection becomes unnecessary, and the operation of the mold clamping device 20 is stably maintained.

The injection molding apparatus 10 includes the mold clamping apparatus 20 and the injection device 50 arranged vertically on the movable platen 28.

If the half nut 26 is disposed on the movable platen 28 of the mold clamping device 20, the injection device 50 (particularly the heating cylinder 53) interferes with the half nut 26. This makes it difficult to dispose the injection device 50 on the movable platen 28. If the injection device 50 is forced to be present on the movable platen 28, the structure around the movable platen 28 becomes complicated.

In this respect, the injection device 50 can be easily disposed on the movable platen 28 because there is space over the movable platen 28 in the embodiment of the present invention. In addition to the injection device 50, the purging cover 64, the upper mold ejector 60, and other components may be disposed on the movable platen 28.

Now, a modification will be described with reference to FIG. 10. Components and parts common to those in FIG. 1 are denoted by the same reference numerals as in FIG. 1, and detailed description thereof is omitted.

As shown in FIG. 10, the injection device 50 is disposed on the bed 21 such that the screw 57 extends horizontally. It should be noted that the injection device 50 may be mounted on the movable plate 28 such that the screw 57 extends horizontally.

Next, another modification will be described with reference to FIG. 11 and FIG. 12.

Figure 11:
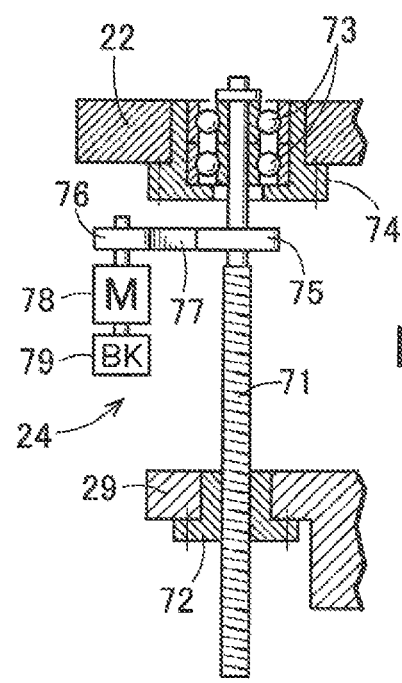
FIG. 11 is a diagram useful to describe a modification of the strong mold opening mechanism.

As shown in FIG. 11, the strong mold opening mechanism 24 may be an electric type mechanism. The electric type strong mold opening mechanism 24 includes a threaded shaft 71, a nut 72 fitted over the threaded shaft 71, a threaded shaft supporting member 74 that has a bearing 73 and rotatably supports the threaded shaft 71, a driven pulley 75 mounted at an intermediate portion of the threaded shaft 71, a drive pulley 76 disposed corresponding to the driven pulley 75, a belt 77 extending over the drive pulley 76 and the driven pulley 75, an electric motor 78 that rotates the drive pulley 76, and an electric brake 79 attached to the electric motor 78. The electric motor 78 and the brake 79 are controlled by a controller 32 shown in FIG. 1.

The threaded shaft supporting member 74 is fixed to the pressure-receiving platen 22 by bolts or the like, and the nut 72 is fixed to the traction platen 29 by bolts or the like. As the screw shaft 71 is rotated by the electric motor 78, the traction platen 29 is moved up and down via the nut 72.

Four modes of operation (i.e., modus 1 to modus 4) of the electrically powered strong mold opening mechanism 24 will now be described.

Modus 1: The brake 79 is kept in a non-braking condition. As the electric motor 78 is rotated forward, the traction platen 29 is separated from the pressure-receiving platen 22. In other words, the strong mold opening mechanism 24 is "extended."

Modus 2: The brake 79 is kept in a non-braking condition. As the electric motor 78 is rotated in a reverse direction, the traction platen 29 approaches the pressure-receiving platen 22. In other words, the strong mold opening mechanism 24 is "contracted."

Modus 3: The electric motor 78 is de-energized by stopping the electricity feeding to the electric motor 78. As the brake 79 is brought into the braking condition, the threaded shaft 71 cannot rotate. As a result, the traction platen 29 is fixed to the pressure-receiving platen 22. That is, the strong mold opening mechanism 24 is in a "blocked" condition.

Modus 4; The electric motor 78 is kept in the non-energized condition. As the brake 79 is brought into a non-braking condition, the threaded shaft 71 can rotate freely. When the traction platen 29 attempts to move upward or downward in the drawing, the threaded shaft 71 rotates. This allows the traction platen 29 to move. In other words, the strong mold opening mechanism 24 is in a "free" condition.

An overall configuration of the injection molding apparatus 10 will be described with reference to FIG. 12. Components and parts common to those in FIG. 1 are denoted by the same reference numerals as in FIG. 1, and detailed description thereof is omitted.

Figure 12:
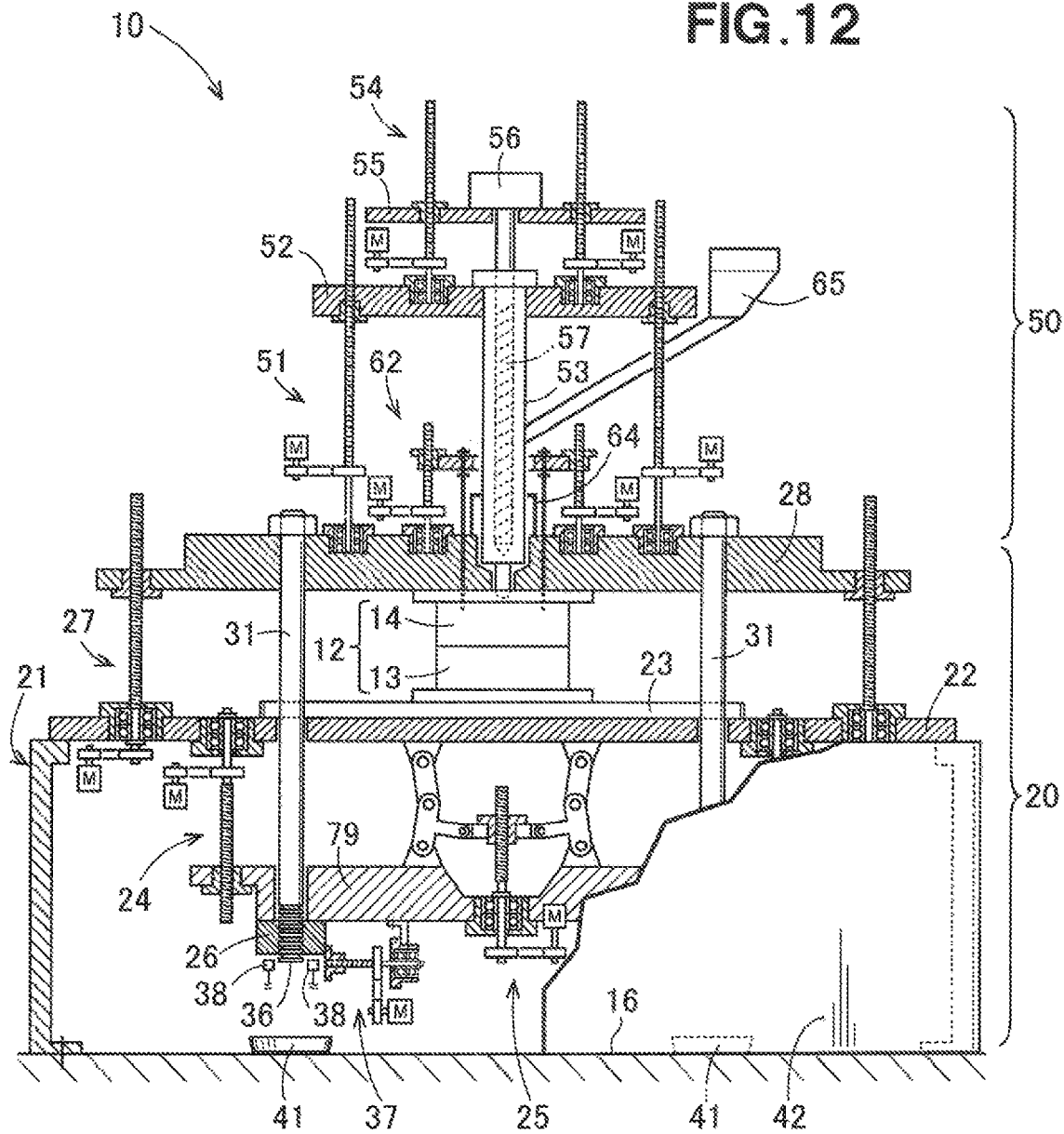
FIG. 12 is a diagram useful to describe a further modification of the injection molding apparatus.

As shown in FIG. 12, the injection molding apparatus 10 includes an electric type strong mold opening mechanism 24, an electric toggle type mold clamping mechanism 25, an electric type mold opening and closing mechanism 27, an electric type half nut opening and closing mechanism 37, an electric type injection device moving mechanism 51, an electric type injection mechanism 54, and an electric type pin moving mechanism 62.

Since the electric type mold clamping mechanism 25, the half nut opening and closing mechanism 37, the injection device moving mechanism 51, the injection mechanism 54, and the pin moving mechanism 62 have the same configurations as those of the electric type strong mold opening mechanism 24 described with reference to FIG. 11, the detailed description of the structure is omitted. It should be noted that the brake 79 may be dispensed with as appropriate.

The modes of operation of the electric type strong mold opening mechanism ("extension," "retraction," "block," and "free") are the same as the modes of operation of the hydraulic type strong mold opening mechanism.

Therefore, the flowcharts shown in FIG. 8 and FIG. 9 are also applied to the injection molding apparatus 10 shown in FIG. 12.

As shown in FIG. 1 and FIG. 12, it is optional that the strong mold opening mechanism 24, the mold clamping mechanism 25, the mold opening and closing mechanism 27, the half nut opening and closing mechanism 37, the injection device moving mechanism 51, the injection mechanism 54, and the pin moving mechanism 62 are all hydraulic cylinders or all electric mechanisms.

Alternatively, one or more mechanisms of the strong mold opening mechanism 24, the mold clamping mechanism 25, the mold opening and closing mechanism 27, the half nut opening and closing mechanism 37, the injection device moving mechanism 51, the injection mechanism 54, and the pin moving mechanism 62 may be hydraulic cylinders, and the remaining mechanisms may be electric mechanisms.

It should also be noted that although the screw rotating mechanism 56 is a hydraulic motor in the above-described embodiment, the screw rotating mechanism may be an electric motor or an electric motor with a speed reducer.

In the embodiment, the injection molding apparatus 10 includes the mold clamping device 20 having the turntable 23, and the vertically arranged injection device 50. The mold clamping device 20 has the vertical mold clamping axis.

It should be noted that the injection molding apparatus 10 may include a mold clamping device 20 having a vertical mold clamping axis without a turntable 23, and the vertically arranged injection device 50.

Alternatively, the injection molding apparatus 10 may include a mold clamping device 20 having a turntable 23 and a vertical mold clamping axis, and a horizontally arranged injection device 50.

Alternatively, the injection molding apparatus 10 may include a mold clamping apparatus 20 having a vertical mold clamping axis without a turntable 23, and a horizontally arranged injection device 50.

What is claimed is:

1. An injection molding apparatus comprising:
    a mold clamping device; and an injection device arranged vertically on the mold clamping device;
    wherein the mold clamping device comprises:
    a bed;
    a pressure-receiving platen supported by and fixed to the bed;
    a traction platen disposed beneath the pressure-receiving platen;
    a movable platen disposed above the pressure-receiving platen and configured to be moved up and down by a mold opening and closing mechanism;
    one or more tie bars connected to and extending downward from the movable platen and penetrating the pressure-receiving platen and the traction platen, each tie bar having a tooth portion at its lower end portion engageable with a tooth portion of a half nut connected to an underside of the traction plate;
    the mold clamping device being configured to clamp molds disposed between the pressure-receiving platen and the movable platen by lowering the traction platen thereby lowering the one or more tie bars and the movable platen together as a unit with the traction platen while each half nut is engaged with the tooth portion of one of the tie bars;
    a strong mold opening mechanism disposed beneath the pressure-receiving platen for opening the molds at an initial stage of a mold opening process, the strong mold opening mechanism having a larger axial force and a shorter stroke than the mold opening and closing mechanism; and
    a control unit configured to control a position of the traction platen, the mold opening and closing mechanism, opening and closing of each half nut and the strong mold opening mechanism, and adjust a position of each half nut such that the half nut is synchronized with the tooth portion of one of the tie bars by the strong mold opening mechanism; and
    wherein the injection device comprises:
    a heating cylinder arranged on the movable platen and containing a rotationally driven screw for feeding resin material downward through the heating cylinder and injecting the resin material through a nozzle into an upper one of the molds when the molds are opened;
    an injection device moving mechanism for moving the heating cylinder upward and downward; and
    a purging cover mounted on the movable platen and enclosing a space between the lower end portion of the heating cylinder and the movable platen.

2. The injection molding apparatus according to claim 1, wherein teeth of each half nut are rectangular teeth, and the tooth portion of each tie bar has rectangular grooves corresponding to the rectangular teeth.

3. The injection moldings apparatus according to claim 1, wherein a lower end face of each tie bar is received in the traction platen when the molds are opened to the maximum.

4. The injection molding apparatus according to claim 1, wherein the bed is enclosed by a cover, each half nut is disposed behind the cover, and a half nut movement monitoring mechanism for monitoring movements of each half nut is provided behind the cover.

5. The injection molding apparatus according to claim 1, wherein a lower part of each tie bar that has the toothed portion is received in the traction plate when the molds are opened to the maximum.

6. The injection molding apparatus according to claim 1, wherein the mold opening and closing mechanism comprises a cylinder depending from an underside of the pressure-receiving platen, and a piston slidable in the cylinder and having a piston rod extending through an opening in the pressure-receiving platen and connected to the movable platen.

* * * * *